3,360,549
ORNITHINE ASPARTATE AND A PROCESS FOR ITS PREPARATION

Hirofuto Marumo and Kunio Saito, Shizuoka-ken, Japan, assignors to Kyowa Hakko Co., Ltd., Tokyo, Japan, a corporation of Japan
No Drawing. Filed Sept. 13, 1963, Ser. No. 308,628
Claims priority, application Japan, Sept. 17, 1962, 37/39,972
3 Claims. (Cl. 260—501.11)

This invention relates to a new compound, ornithine aspartate, and its preparation.

Aspartic acid is a well known drug used for preventing fatigue, hepatic disturbance and so on. On the other hand, ornithine is admitted to be a remarkably effective antidote to ammonium in blood. Therefore, it is clinically very significant to use both drugs together and actually their effects have been apparently observed.

It is thought to be possible by mixing free ornithine with free aspartic acid to use them together. But, actually in practice this is difficult to do because of the extreme difficulty in obtaining free ornithine in high purity. Even if it could be obtained, it is considerably unstable and tends to absorb $CO_2$ from the air to form carbonate.

The inventors of this application considered that it would be very convenient for preparation and administration to use ornithine aspartate if ornithine and aspartic acid could be chemically bonded to form the salt. As the result of our attempt to make it, we found that ornithine aspartate could be formed by reacting ornithine with aspartic acid.

The following is a description of the method for separating ornithine aspartate from the reaction solution.

When ornithine aspartate is in the form of aqueous solution, precipitate is not formed when the concentration is less than 55% (w./w.) of the salt even after standing for many hours at room temperature, but when the concentration is from 60 to 70% (w./w.) precipitate is formed after standing. By separating the precipitate, ornithine aspartate can be obtained. But the above salt is not crystalline and is unsuitable for the use by injection in its quality.

Therefore, for the purpose of obtaining a product which can be used by injection, it is preferable to crystallize by some means the ornithine aspartate which is difficultly crystallized and to remove the impurities in the mother liquor at the separation. As the result of various attempts concerning this aspect, the inventors found that the needle-shaped gathering crystal of ornithine aspartate could be obtained by adding very gradually solvents, such as methanol or ethanol to the 20 to 70% (w./w.) aqueous solution of ornithine aspartate and separating this crystal by filtration. The quality of the product obtained is sufficient for using by injection. It is most important in this method to make the speed of addition of the above solvents extremely slow since the crystals of ornithine aspartate grow very slowly. When the speed of the addition is fast, the degree of excess saturation of the solution become large and ornithine aspartate is unable to crystallize. It forms amorphous precipitate and the purity of the product deteriorates. Suitable speed of the addition of the solvent is governed by the concentration of the solution and the kind of the solvents. In the range of the concentration of from 20 to 70% of ornithine aspartate, the same volume of the solvents (methanol or ethanol) as the solution is desirably added in more than 50 hours. Until the solution is saturated, the solvent may be added rapidly. When the solution becomes saturated, seed of crystals should be added and then the addition of the solvent is continued. But it is also possible to crystallize the salt leaving the solution as it is.

The crystal of the ornithine aspartate (A) obtained by adding the solvent gradually as described above is superior in its quality to the noncrystalline precipitate (B) obtained directly from the aqueous solution as shown in the following table.

| | A | B |
|---|---|---|
| Ignition residue | <0.02% | 0.1%. |
| Heavy metal | <0.003% | <0.003%. |
| Arsonic | <0.0001% | 0.0001–0.0004%. |
| Specific rotation ($[α]_D^{20}C = 8$, in 6N–HCl) | +26°–+29° | +24°–+26°. |
| Purity (on the basis of dryproduct) | 98–100% | 95–96%. |
| Melting point | 200–202° C | 202–204° C. |
| Water of crystallization (40°, 10 hours) | 1 molecule | None. |
| Pyrogen test | Stand | Not stand. |

Ornithine aspartate is a novel compound and has the following chemical formula:

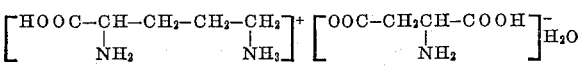

The physical properties of the novel compound are described in Example 1.

Example 1

10 kg. of ornithine hydrochloride is dissolved in water to make 100 l. of solution and this solution is passed through the cylinder of 50 l. of strongly acidic ion-exchange resin (H-type) to be absorbed by it. Next, the salt is effused by 200 l. of 3.5% aqueous ammonium. When the pH of the effluent come to 8, 150 l. of the effluent is collected and concentrated at reduced pressure at 50° C. to remove ammonium. After the aqueous solution of free ornithine thus obtained is prepared into the concentration of about 200 g./l., the crystal of free aspartic acid is added and dissolved in it until the pH of the solution come to 7.0. To the solution is added 0.5 kg. of active carbon to be decolorized and filtered at 60° C. and further concentrated to give 50% (w./w.) aqueous solution of ornithine aspartate. To 10 l. of the solution (containing 5950 g. of ornithine aspartate) 2.5 l. of ethanol is added and slight turbidity occurs. Then, the resulting solution is heated at about 40° C. to dissolve the turbidity. The solution is cooled to 25° C. and about 10 g. of seed of crystal is added to it and made stand at room temperature for 2 days. Then, the crystal is separated and the solution solidifies to the degree as hardly having fluidity. This solidified solution is centrifuged and dried in vacuum at 50° C. to give 2376 g. of ornithine aspartate monohydrate (2190 g. as anhydride). The purity of the salt is 99.6% and the yield for the 50% aqueous solution is 36.6%.

After the recrystallization of the product, the needle-shaped gathering crystal of the length of about 200μ is obtained. This crystal has the melting point of 202° C. and its solubility in water is 203 g./l. at 20° C. and it is soluble with difficulty or insoluble in organic solvents. The elementary analysis of the product is: C, 38.30%; N, 14.75%; H, 39.50%; O, 74.5%. (According to calculation: C, 38.16%; N, 14.8%; H, 39.58%; O, 74.2%.) $[α]_D^{20}$ is 25.68 (c.=8, 6 N HCl) and 1.88 (c.=8, water). The product has one molecule of water of crystallization and loses it after drying at 105° C. for 30 hours. The crystal before the above recrystallization comes up to the standard for the use by injection.

Example 2

To 15 l. of 50% (w./w.) aqueous solution of ornithine aspartate obtained in Example 1 (containing 8930 g. of ornithine aspartate) 3 l. of methanol is added. The small quantity of precipitate formed is dissolved by heating at 40° C. The resulting solution is cooled to 25° C. and added 10 g. of seed of crystal and stirred for 10 hours. When crystallization occurs to some degree, 3 l. of methanol is continuously dropped into the solution at the rate of 500 ml./hour with stirring. After the dropping is completed, the solution is stirred for 10 hours and centrifuged. The crystal obtained is dried in vacuum at 50° C. 4.97 kg. of ornithine aspartate monohydrate (4.65 kg. as anhydride) is obtained. The purity of the product is 99.5% and the yield for the 50% aqueous solution is 52.0%. The quality of the product is similar to that of Example 1.

Each of certain amounts (amount for use) of ornithine aspartate and aspartate (mixture of potassium salt and magnesium salt) dissolved respectively in physiological solution and physiological solution are injected intra-abdominally to Wistar rats. The rats are made to swim 30 minutes after the injection and 2 hours 30 minutes after the completion of the first time swimming. The anti-fatigue effect measured by the swimming time is shown in Table 1. From the table it is clearly seen that ornithine aspartate has very outstanding effect as an anti-fatigue drug.

The rats used: Wistar rats, body weight of 100–120 g.;

The method of administration of the sample: intra-abdominal injection, the concentration of the administered solution of 50 mg./ml.;

The conditions of the water tank: water temperature of 28° C., stirred with exhaust gas pump;

Regulation of individual variation: one week prior to the above test many rats are examined by swimming test at 28° C. and they are classified to 3 classes of A, B and C according to their abilities and those belonging to the B group are collected in the proportion of 8 to 21.

The method of measurement: when a rat sinks and cannot come up to the surface of the water, the rat is considered to become fatigued and the swimming time until then is measured.

TABLE 1

| Method for measurement | | Control | | Aspartate (K. Mg. salt) | | Ornithine aspartate | |
|---|---|---|---|---|---|---|---|
| Administrated dose, mg./kg. | The time of beginning of measurement (The time after administration) | Swimming time | | Swimming | | Swimming | |
| | Hrs. | Min. | Min. | Sec. | Min. | Sec. | Min. | Sec. |
| 100 | ---------- | 30 | 33 | 46 | 36 | 23 | 45 | 04 |
| | 2 | 30 | 32 | 43 | 36 | 10 | 50 | 16 |
| 150 | ---------- | 30 | 48 | 44 | 49 | 44 | 59 | 00 |
| | 2 | 30 | 47 | 03 | 53 | 22 | 58 | 20 |
| 200 | ---------- | 30 | 35 | 40 | 42 | 24 | 55 | 04 |
| | 2 | 30 | 28 | 07 | 35 | 06 | 46 | 17 |

(Annotation) The swimming time shown above is the mean value of the 8 rats respectively.

What we claim is:
1. Crystalline ornithine aspartate.
2. Crystalline ornithine aspartate monohydrate of the formula

3. A process for the preparation of crystalline ornithine aspartate which comprises preparing an aqueous solution of free ornithine having a concentration of about 200 grams per liter, adding to the said solution and dissolving therein crystalline aspartic acid until the pH of the said solution is about 7, concentrating the said solution to a concentration of about 50% aqueous ornithine aspartate, slowly adding to the aqueous solution a member selected from the group consisting of methanol and ethanol, cooling the resultant solution and isolating therefrom crystals of ornithine aspartate monohydrate, heating the crystals at a temperature of about 105° C. for about 30 hours and recovering the resulting crystalline ornithine aspartate.

References Cited

UNITED STATES PATENTS 2,657,230 10/1953 Rogers _____ 260—501
2,851,482 9/1958 Barker _____ 260—501
3,020,201 2/1962 Osterberg _____ 260—501

FOREIGN PATENTS

M 86 2/1961 France.

OTHER REFERENCES

Salvatore et al., Nature, vol. 191, 1961, pages 705–6.
Salvatore et al., Chem. Abstracts, vol. 54, 1960, col. 3712B.
Salvatore et al., Chem. Abstracts, vol. 52, 1958, col. 18906.
Salvatore et al., reported in Chem. Abstracts, vol. 58, 1963, col. 12953.

LORRAINE A. WEINBERGER, *Primary Examiner.*

B. HEFLIN, *Examiner.*

B. M. EISEN, M. WEBSTER, *Assistant Examiners.*